(12) United States Patent
Fu et al.

(10) Patent No.: US 12,120,200 B2
(45) Date of Patent: Oct. 15, 2024

(54) FLEXIBLE DATA ANALYTICS PROCESSING AND EXPOSURE IN 5GC

(71) Applicant: Telefonaktiebolaget LM Ericsson (publ), Stockholm (SE)

(72) Inventors: Zhang Fu, Stockholm (SE); Göran Eriksson, Norrtälje (SE); Dinand Roeland, Sollentuna (SE)

(73) Assignee: Telefonaktieabolaget LM Ericsson (Publ), Stockholm (SE)

( * ) Notice: Subject to any disclaimer, the term of this patent is extended or adjusted under 35 U.S.C. 154(b) by 557 days.

(21) Appl. No.: 17/424,663

(22) PCT Filed: Jan. 21, 2020

(86) PCT No.: PCT/IB2020/050453
§ 371 (c)(1),
(2) Date: Jul. 21, 2021

(87) PCT Pub. No.: WO2020/152586
PCT Pub. Date: Jul. 30, 2020

(65) Prior Publication Data
US 2022/0086257 A1 Mar. 17, 2022

Related U.S. Application Data

(60) Provisional application No. 62/794,924, filed on Jan. 21, 2019.

(51) Int. Cl.
| | |
|---|---|
| *H04L 67/63* | (2022.01) |
| *H04L 41/14* | (2022.01) |
| *H04L 43/00* | (2022.01) |
| *H04L 67/00* | (2022.01) |
| *H04L 67/51* | (2022.01) |
| *H04W 4/50* | (2018.01) |

(52) U.S. Cl.
CPC .............. *H04L 67/63* (2022.05); *H04L 41/14* (2013.01); *H04L 43/14* (2013.01); *H04L 67/34* (2013.01); *H04L 67/51* (2022.05); *H04W 4/50* (2018.02)

(58) Field of Classification Search
CPC ......... H04L 67/63; H04L 41/14; H04L 43/14; H04L 67/34; H04L 67/51; H04L 41/5009; H04W 4/50; G06F 9/5077
USPC ....................................................... 455/414.1
See application file for complete search history.

(56) References Cited

U.S. PATENT DOCUMENTS

| | | |
|---|---|---|
| 2016/0094420 A1 | 3/2016 | Clemm et al. |
| 2017/0347283 A1 | 11/2017 | Kodaypak |
| 2018/0077590 A1 | 3/2018 | Sharma et al. |
| 2020/0275255 A1* | 8/2020 | Wang ..................... H04W 8/20 |

OTHER PUBLICATIONS

3rd Generation Partnership Project; Technical Specification Group Services and System Aspects; Study of Enablers for Network Automation for 5G (Release 16), 3GPP TR 23.791 V1.0.0 (Year: 2018).*
Author Unknown, "Technical Specification Group Services and System Aspects; Study of Enablers for Network Automation for 5G (Release 16)," Technical Report 23.791, Version 1.0.0, 3GPP Organizational Partners, Sep. 2018, 66 pages.
Author Unknown, "Technical Specification Group Services and System Aspects; Study of Enablers for Network Automation for 5G (Release 16)," Technical Report 23.791, Version 16.0.0, 3GPP Organizational Partners, Dec. 2018, 121 pages.
Author Unknown, "Technical Specification Group Services and System Aspects; System Architecture for the 5G System; Stage 2 (Release 15)," Technical Specification 23.501, Version 15.4.0, 3GPP Organizational Partners, Dec. 2018, 236 pages.
Author Unknown, "Technical Specification Group Services and System Aspects; Procedures for the 5G System; Stage 2 (Release 15)," Technical Specification 23.502, Version 15.4.0, 3GPP Organizational Partners, Dec. 2018, 346 pages.
Author Unknown, "WolframAlpha: Computational Intelligence," Wolfram Alpha LLC, retrieved Jul. 20, 2021, 1 page, URL: https://www.wolframalpha.com/.
International Search Report and Written Opinion for International Patent Application No. PCT/IB2020/050453, mailed Mar. 27, 2020, 25 pages.
EPO Communication dated Apr. 18, 2024 for Patent Application No. 20702923.2, consisting of 9 pages.

* cited by examiner

*Primary Examiner* — Tanmay K Shah
(74) *Attorney, Agent, or Firm* — Weisberg I.P. Law, P.A.

(57) ABSTRACT

Methods and systems for providing flexible information exposure in a Fifth Generation (5G) Core (5GC) and an Operations, Administration, and Maintenance (OAM) system are provided. According to one aspect of the present disclosure, a method, performed by a first network node of a 5GC for providing flexible information exposure in the 5GC and an OAM system, comprises: receiving, from a second network node, a request to register the second network node as a provider of data and/or a compute function; registering the second network node as a provider of the data and/or the compute function; storing information associating the second network node with the data and/or compute function provided by the second network node; and sending, to the second network node, a response to the request to register the second network node as a provider of data and/or a compute function.

8 Claims, 15 Drawing Sheets

NWDAF in its context

*Data source registration*

*Compute function registration*

Handling an information request

*Example of a pipeline of compute functions*

*Data pipeline example*

*Example of two independent pipelines*

*Example of partially merged pipelines*

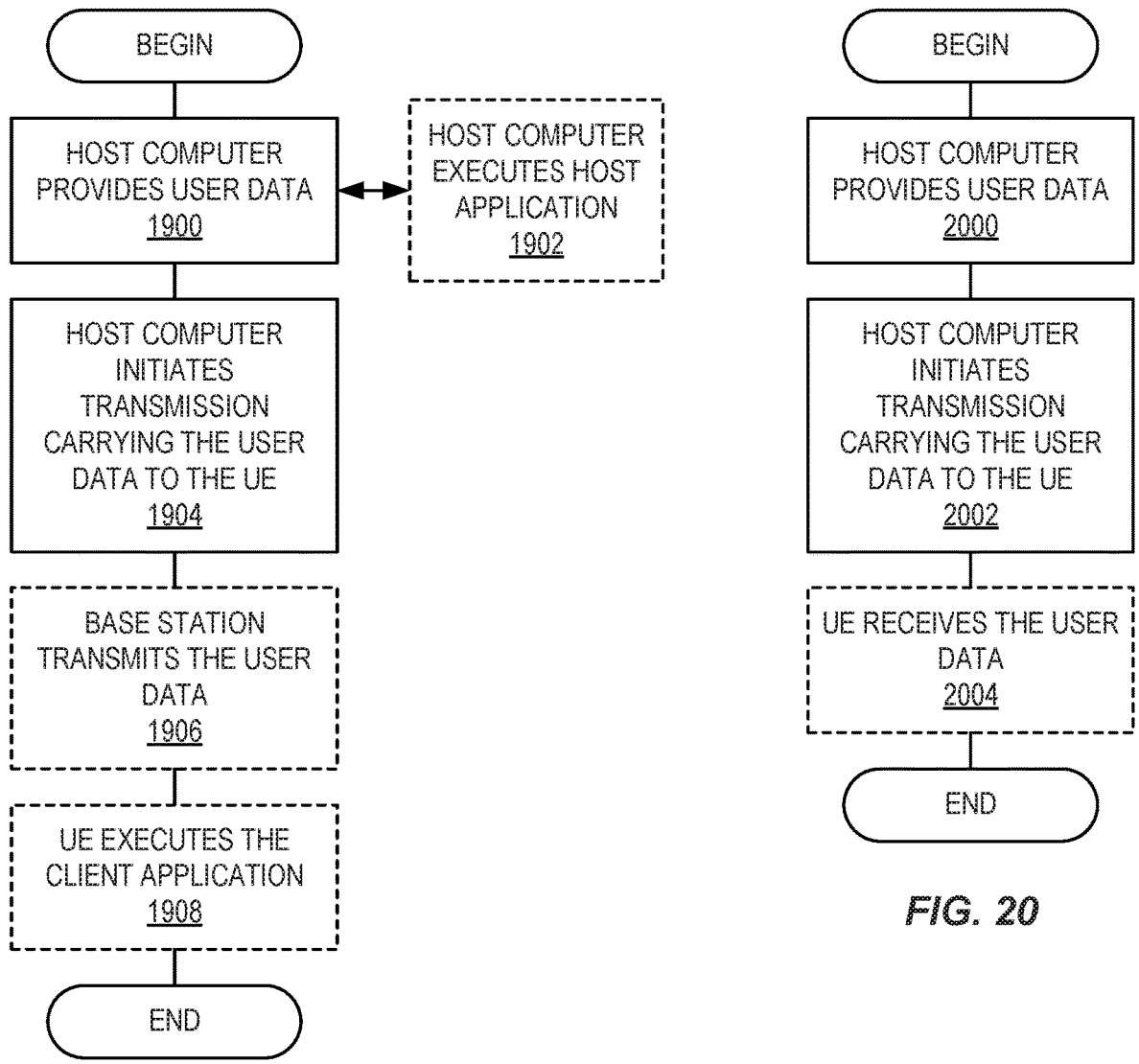

FLEXIBLE DATA ANALYTICS PROCESSING AND EXPOSURE IN 5GC

RELATED APPLICATIONS

This application is a 35 U.S.C. § 371 national phase filing of International Application No. PCT/IB2020/050453, filed Jan. 21, 2020, which claims the benefit of provisional patent application Ser. No. 62/794,924, filed Jan. 21, 2019, the disclosures of which are hereby incorporated herein by reference in their entireties.

TECHNICAL FIELD

This application relates to data analytics processing and data exposure in a Fifth Generation Core network.

BACKGROUND

In Third Generation Partnership Project (3GPP) Technical Specification (TS) 23.501, Version 15.4.0 the Network Data Analytics Function (NWDAF) is defined. It is a logical entity that can provide analytics information to a Network Function (NF). Currently two services are specified:

TABLE 1

| List of NWDAF services | | |
|---|---|---|
| Service Name | Description | Reference in TS 23.502 [3] |
| Nnwdaf_EventsSubscription | This service enables the NF service consumers to subscribe/unsubscribe for different type of analysis information (i.e., load level information of Network Slice instance) from NWDAF. | 5.2.11.2 |
| Nnwdaf_AnalyticsInfo | This service enables the NF service consumers to request and get different type of analysis information (i.e., load level information of Network Slice instance) s from NWDAF. | 5.2.11.3 |

The ongoing study 3GPP Technical Report (TR) 23.791, Version 16.0.0 further defines the use cases of the NWDAF and the internals of the NWDAF. FIG. 1 is taken from that study and defines the context of the NWDAF.

FIG. 1 illustrates a portion of a conventional telecommunications core network that contains a NWDAF. The NWDAF receives data from a variety of data providers, which may include NFs and/or Application Functions (AFs). The NWDAF stores the data, e.g., locally and/or on one or more data repositories, for later access as needed. The NWDAF receives requests for data from a variety of data consumers, and responds to those requests, e.g., by delivering analytics data. In FIG. 1, the NWDAF may also communicate with an Operations, Administration, and Maintenance (OAM) node, which may also be referred to as an Operation and Maintenance (O&M) node. It should be noted that a data provider may also be a data consumer, and that the NWDAF, data repositories, and OAM node may also be data providers, data consumers, or both.

SUMMARY

There currently exist certain challenge(s). Very diverse use cases are defined for the NWDAF. Use cases that are defined by 3GPP will likely end up in the 3GPP specifications for NWDAF. This also implies that the interfaces to/from the NWDAF need to support each individual use case. Adding new standardized use cases will take time. Furthermore, it is likely that there will be non-standardized use cases. For example, an NWDAF may be configured to receive User Plane Function (UPF) messages reporting statistics of User Equipment (UE) data flows, so that anomaly detection or dynamic load balancing can be enabled. There are many types of UPFs, and the types of data or monitoring logs that they produce can be quite different. As a result it is difficult, from a standardization viewpoint, to define every possible data exposure from a UPF. This standardization difficulty increases arithmetically for each additional NF/AF that the NWDAF must support.

The present disclosure may provide solutions to the aforementioned or other challenges. According to one aspect of the instant disclosure, any NF/AF can request the NWDAF for any type of information. The term "request" is used in a generic sense here: it can mean either a request for information (which may also be referred to as "an information request) or a request to subscribe to events (see Table 1, above). When the NWDAF receives a request, it internally deduces what is needed to produce a reply for such a request. This deduction is based on two inputs: 1) the NWDAF receives data from one or more sources and 2) the NWDAF has one or more functions that can transform one or more input data into one output data.

A framework for flexible information exposure in Fifth Generation (5G) Core Network (5GC) is also proposed.

There are, proposed herein, various embodiments which address one or more of the issues disclosed herein. Certain embodiments may provide one or more of the following technical advantage(s). The proposed methods enable flexible information requests to and exposure from the core network, such that it can expose data for any use case rather than only some predefined data types or events by 3GPP. The proposed methods are suitable especially when some sensitive raw data cannot be exposed externally. The data can be processed within the core network and only the output is revealed to a third party. The proposed methods also enable flexible and easy data exposure among NFs in the core network.

According to one aspect of the present disclosure, a method, performed by a first network node of a Fifth Generation (5G) Core Network (5GC) for providing flexible information exposure in the 5GC and an Operations, Administration, and Maintenance (OAM) system, comprises:

receiving, from a second network node, a request to register the second network node as a provider of data and/or a compute function; registering the second network node as a provider of the data and/or the compute function; storing information associating the second network node with the data and/or compute function provided by the second network node; and sending, to the second network node, a response to the request to register the second network node as a provider of data and/or a compute function.

According to another aspect of the present disclosure, a method, performed by a first network node of a Fifth Generation (5G) Core Network (5GC) for providing flexible information exposure in the 5GC and an Operations, Administration, and Maintenance (OAM) system, comprises: receiving, from a data consumer, a request for information; deducing how to produce the requested information; producing the requested information; and sending, to the data consumer, an information response.

According to another aspect of the present disclosure, a method, performed by a first network node of a Fifth Generation (5G) Core Network (5GC) for providing flexible information exposure in the 5GC and an Operations, Administration, and Maintenance (OAM) system, comprises: sending, to a second network node, a request to register the first network node as a provider of data and/or a compute function; and receiving, from the second network node, a response to the request to register the first network node as a provider of data and/or a compute function.

According to another aspect of the present disclosure, a method, performed by a first network node of a Fifth Generation (5G) Core Network (5GC) for providing flexible information exposure in the 5GC and an Operations, Administration, and Maintenance (OAM) system, comprises: sending, to a second network node, a request for information; and receiving, from the second network node, an information response; wherein the request for information: specifies a data process pipeline to be used to generate the requested information; identifies a template for a data process pipeline to be used to generate the requested information; or identifies the requested information.

According to another aspect of the present disclosure, a network node of a Fifth Generation (5G) Core Network (5GC) for providing flexible information exposure in the 5GC and an Operations, Administration, and Maintenance (OAM) system comprises processing circuitry configured to perform any of the steps described herein and power supply circuitry configured to supply power to the network node.

According to another aspect of the present disclosure, a network node of a Fifth Generation (5G) Core Network (5GC) for providing flexible information exposure in the 5GC and an Operations, Administration, and Maintenance (OAM) system comprises processing circuitry configured to perform any of the steps described herein and power supply circuitry configured to supply power to the network node.

According to another aspect of the present disclosure, a network node of a Fifth Generation (5G) Core Network (5GC) for providing flexible information exposure in the 5GC and an Operations, Administration, and Maintenance (OAM) system comprises processing circuitry configured to perform any of the steps described herein and power supply circuitry configured to supply power to the network node.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 19 is a flowchart illustrating a method, implemented in a communication system, for providing flexible information exposure in the 5GC and an Operations, Administration, and Maintenance (OAM) system according to some embodiments of the present disclosure;

FIG. 20 is a flowchart illustrating another method, implemented in a communication system, for providing flexible information exposure in the 5GC and an Operations, Administration, and Maintenance (OAM) system according to some embodiments of the present disclosure;

DETAILED DESCRIPTION

Figure 1:
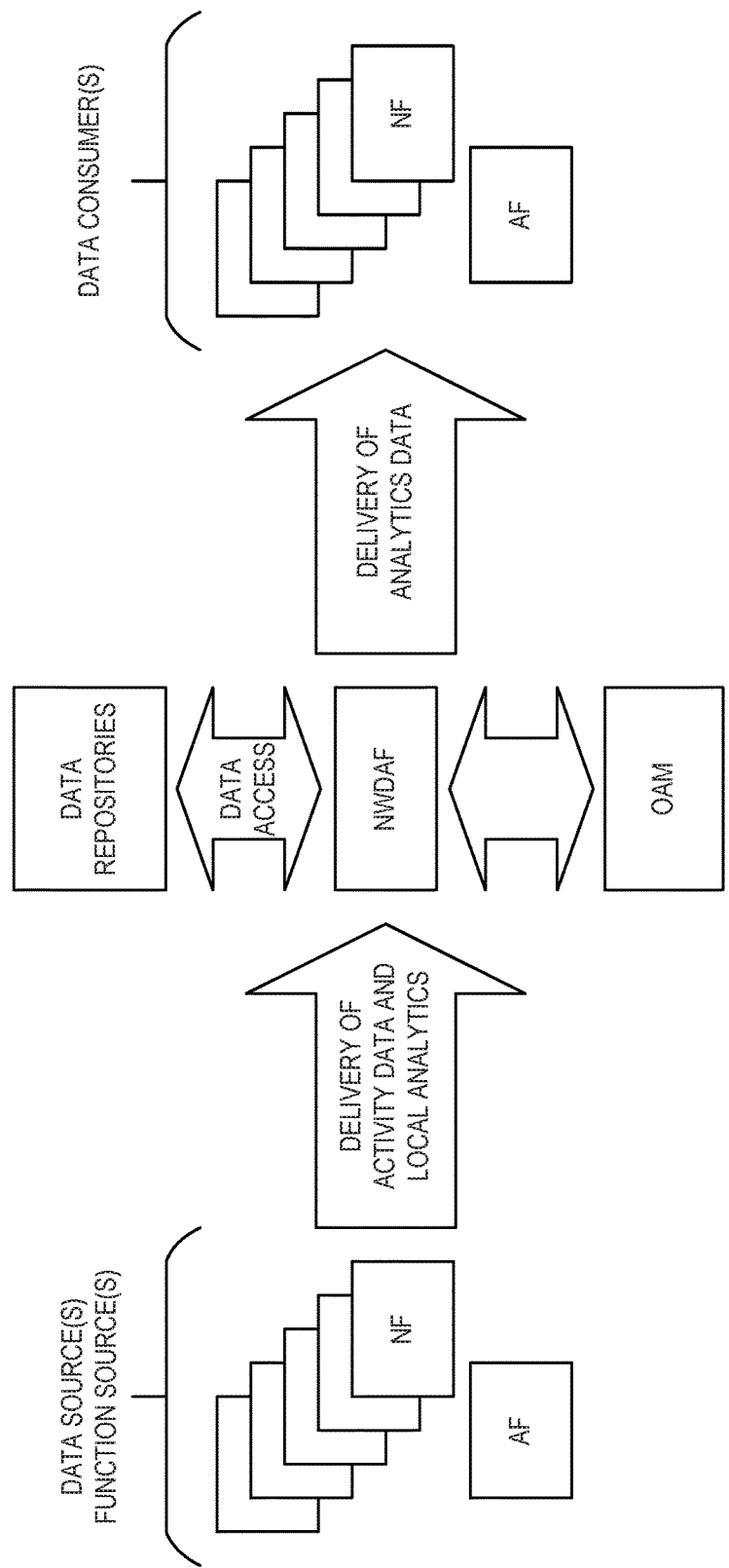
FIG. 1 illustrates a portion of a conventional telecommunications core network that contains a Network Data Analytics Function (NWDAF)

Very diverse use cases are defined for the NWDAF. Use cases that are defined by 3GPP will likely end up in the 3GPP specifications for NWDAF. This also implies that the interfaces to/from the NWDAF need to support each individual use case. Adding new standardized use cases will take time. Furthermore, it is likely that there will be non-standardized use cases. For example, an NWDAF may be configured to receive User Plane Function (UPF) messages reporting statistics of User Equipment (UE) data flows, so that anomaly detection or dynamic load balancing can be enabled. There are many types of UPFs, and the types of data or monitoring logs that they produce can be quite different. As a result it is difficult, from a standardization viewpoint, to define every possible data exposure from a UPF. This standardization difficulty increases arithmetically for each additional NF/AF that the NWDAF must support.

To support all these different use cases, it would be beneficial to have a method that allows requests to the NWDAF (and replies from the NWDAF) to be defined in a more generic way. Such a method could then support a variety of use cases, without the need to standardize each individual use case.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a 3GPP 5G NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), an Access and Mobility Management Function (AMF), a Session Management Function (SMF), a Network Exposure Function (NEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a UE in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 2:
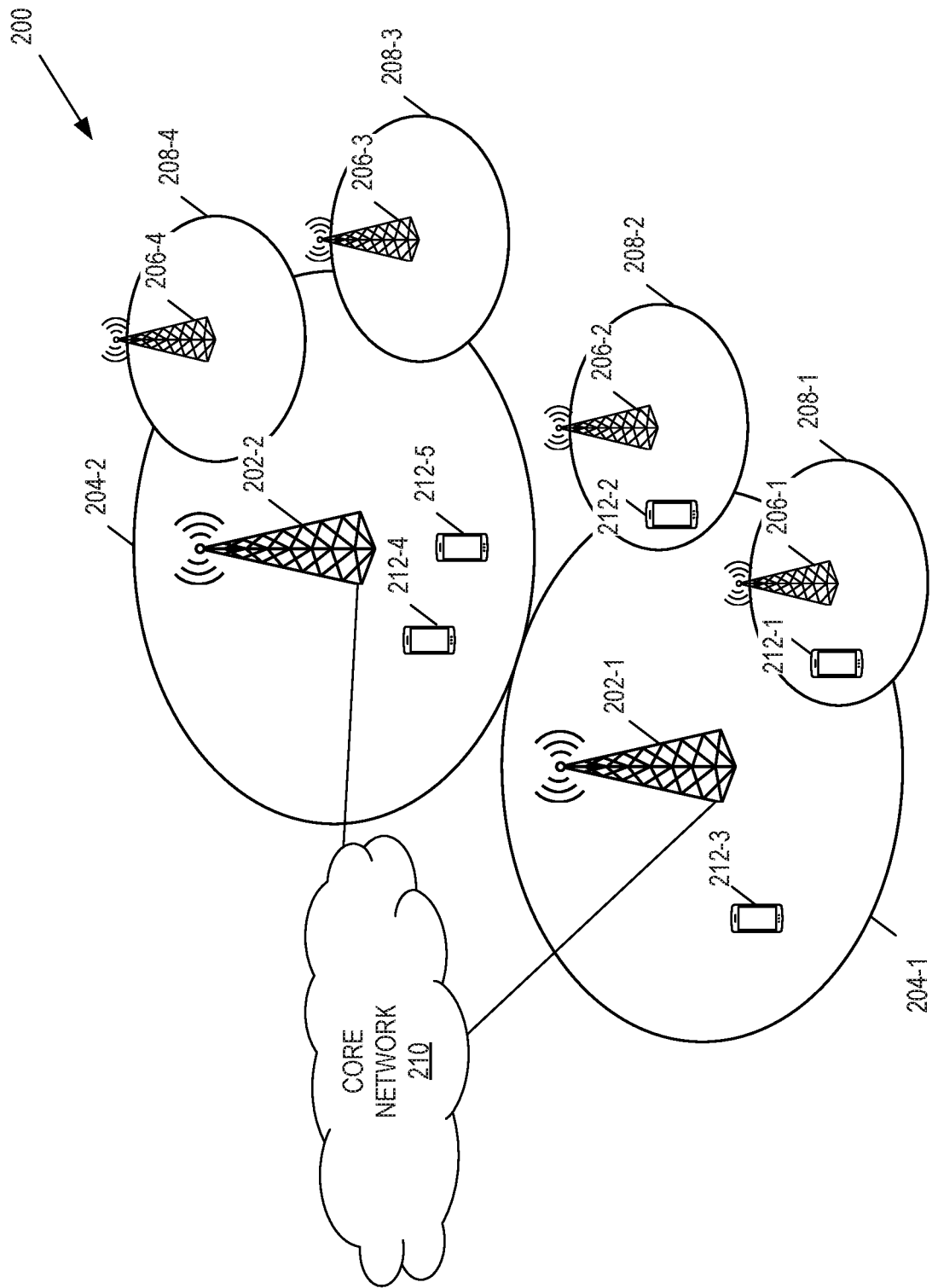
FIG. 2 illustrates one example of a cellular communications network.

FIG. 2 illustrates one example of a cellular communications network 200 according to some embodiments of the present disclosure, where the cellular communications network 200 is a 5G NR network. In this example, the cellular communications network 200 includes base stations 202-1 and 202-2, which in LTE are referred to as eNBs and in 5G NR are referred to as gNBs, controlling corresponding macro cells 204-1 and 204-2. The base stations 202-1 and 202-2 are generally referred to herein collectively as base stations 202 and individually as base station 202. Likewise, the macro cells 204-1 and 204-2 are generally referred to herein collectively as macro cells 204 and individually as macro cell 204. The cellular communications network 200 may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The base stations 202 (and optionally the low power nodes 206) are connected to a core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Figure 3:
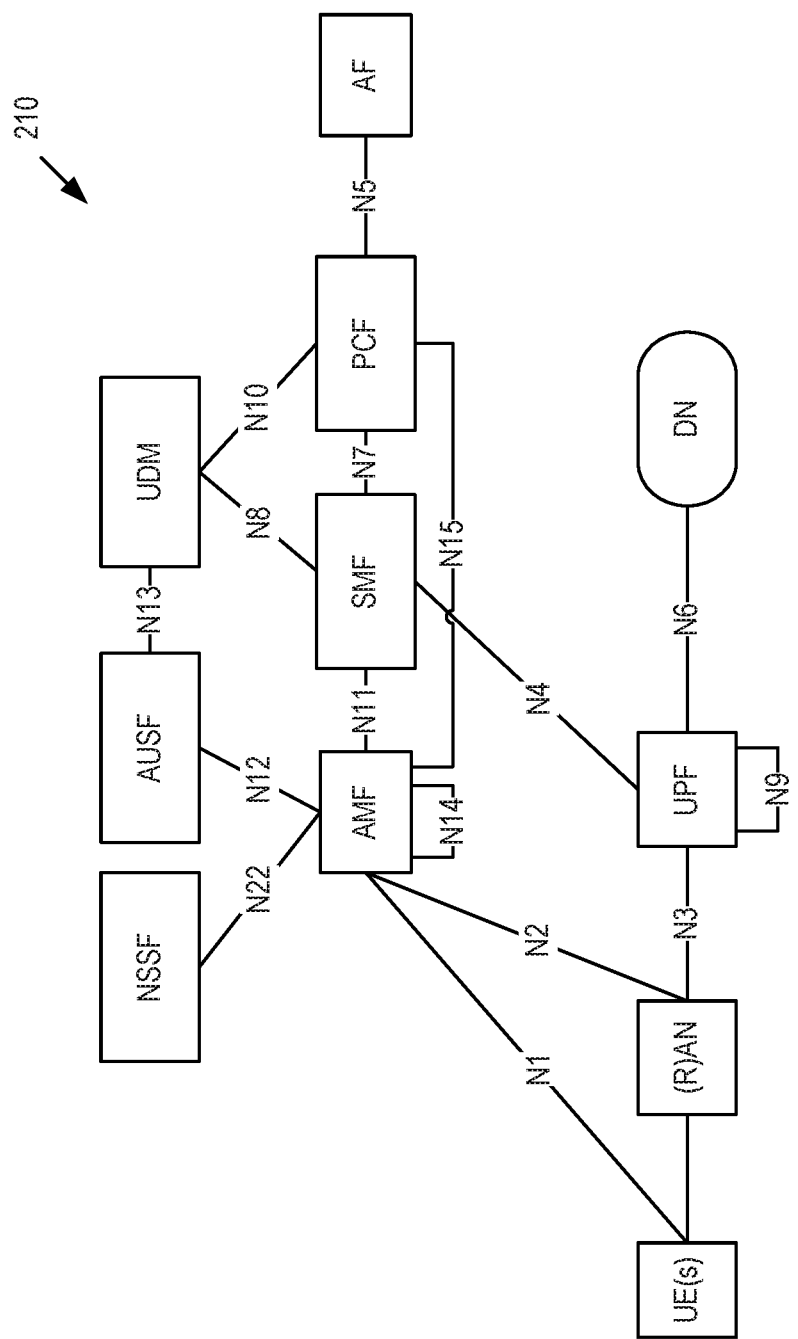
FIG. 3 illustrates a wireless communication system represented as a Fifth Generation (5G) network architecture composed of core Network Functions (NFs), where interaction between any two NFs is represented by a point-to-point reference point/interface.

FIG. 3 illustrates a wireless communication system represented as a 5G network architecture composed of core NFs, where interaction between any two NFs is represented by a point-to-point reference point/interface. FIG. 3 can be viewed as one particular implementation of the system 200 of FIG. 2.

Seen from the access side the 5G network architecture shown in FIG. 3 comprises a plurality of UEs connected to either a Radio Access Network (RAN) or an Access Network (AN) as well as an Access and Mobility Management Function (AMF). Typically, the (R)AN comprises base stations, e.g., eNBs or gNBs or similar. Seen from the core network side, the 5G core NFs shown in FIG. 3 include a Network Slice Selection Function (NSSF), an Authentication Server Function (AUSF), a Unified Data Management (UDM), an AMF, a Session Management Function (SMF), a Policy Control Function (PCF), and an AF.

Reference point representations of the 5G network architecture are used to develop detailed call flows in the normative standardization. The N1 reference point is defined to connect (i.e., carry signaling between) the UE and the AMF. The N2 reference point connects the (R)AN and the AMF. The N3 reference point connects the (R)AN and the UPF. The N4 reference point is used by the SMF and the UPF so that the UPF can be set using the control signal generated by the SMF, and so that the UPF can report its state to the SMF. The N5 reference point connects the PCF and an AF. The N6 reference point connects the UPF and a Data Network (DN). The N7 reference point is used by the PCF to apply policy to the SMF. The N8 reference point is used to communicate subscription data of the UE to the AMF. The N9 reference point connects different UPFs. The N10 reference point is used to communicate subscription data of the UE to the SMF. The N11 reference point connects the AMF and SMF, which implies that the SMF is at least partly controlled by the AMF. The N12 reference point is used by the AMF to perform authentication of the UE. The N13 reference point connects the AUSF and the UDM. The N14 reference point connects different AMFs. The reference point N15 is used by the PCF to apply policy to the AMF.

The 5G core network aims at separating the user plane and control plane. The user plane carries user traffic while the control plane carries signaling in the network. In FIG. 3, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 3. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 4:
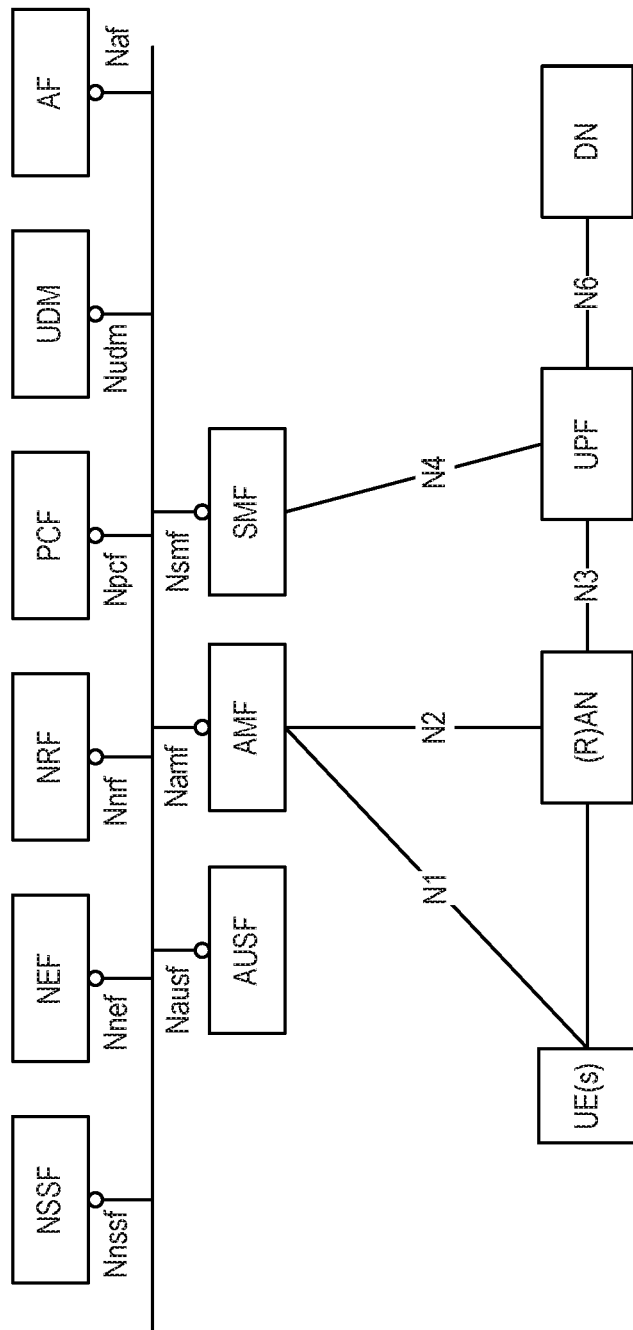
FIG. 4 illustrates a 5G network architecture using service-based interfaces between the NFs in the control plane.

FIG. 4 illustrates a 5G network architecture using service-based interfaces between the NFs in the control plane, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFs through the service-based interface. In FIG. 4 the service based interfaces are indicated by the letter "N" followed by the name of the NF, e.g., Namf for the service based interface of the AMF and Nsmf for the service based interface of the SMF etc. The Network Exposure Function (NEF) and the Network Repository Function (NRF) in FIG. 4 are not shown in FIG. 3 discussed above. However, it should be clarified that all NFs depicted in FIG. 3 can interact with the NEF and the NRF of FIG. 4 as necessary, though not explicitly indicated in FIG. 3.

Some properties of the NFs shown in FIGS. 3 and 4 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The DN, not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

According to some embodiments of the present disclosure, any NF/AF can send a request to an appropriate node, such as the NWDAF, for any type of information. As used herein, the term "request" refers to any kind of request. Examples of requests may include, but are not limited to, a one-time request for information or a request to subscribe to events (see Table 1). While the following examples use the NWDAF as the appropriate node, the concepts described herein could also be implemented in other nodes, including but not limited to 5GC nodes, Management Function (MF) nodes or other nodes comprising an Operations, Administration, and Maintenance (OAM) subsystem, and nodes comprising a Self-Organizing Network (SON). Examples of MF nodes include, but are not limited to, a Management Data Analytics Function (MDAF), a Communication Service Management Function (CSMF), a Network Slice Management Function (NSMF), and a Network Sub-Slice Management Function (NSSMF).

When the NWDAF receives a request, it internally deduces what is needed to produce a reply for such a request. In some embodiments, this deduction may be based upon factors such as (a) whether or not the NWDAF receives data from one or more sources and (b) whether or not the NWDAF has one or more functions that can transform one or more input data into one output data. Other factors may be used in addition to (or instead of) the factors described above.

The solution may include several steps. In some embodiments, these steps may include data source and/or function source registration, information request handling, and pipeline creation/modification. Each of these is described in more detail in the following sections, using an example network having a function source, a data source, an NWDAF, and a data consumer.

Data Source Registration

Figure 5:
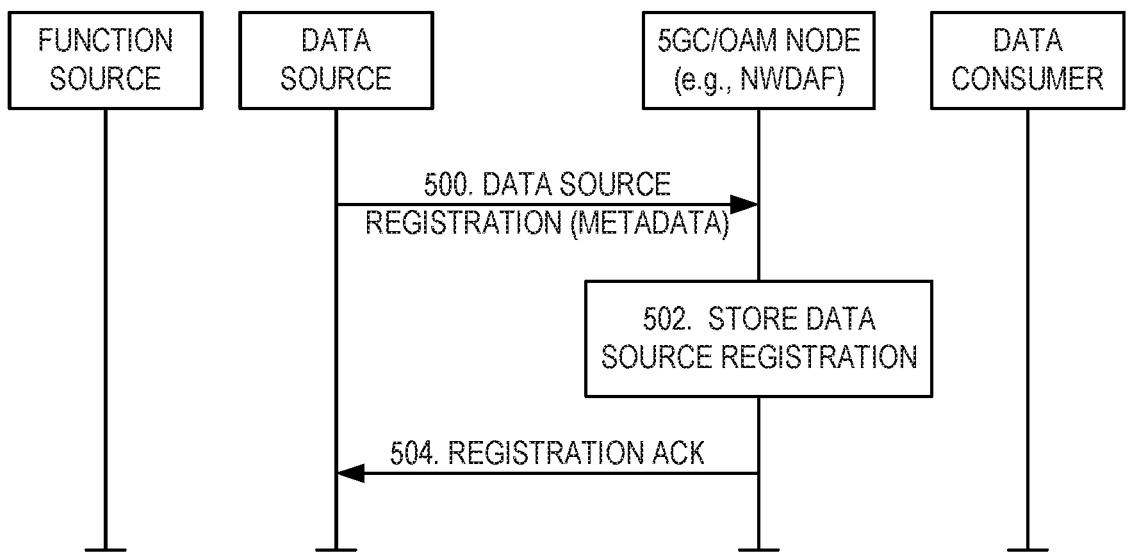
FIG. 5 is a sequence diagram illustrating an example data source registration according to some embodiments of the present disclosure.

FIG. 5 illustrates an exemplary process for data source registration according to some embodiments of the present disclosure, by which a data source may inform the NWDAF about data that the NWDAF can receive from the data source. In the embodiment illustrated in FIG. 5, at step 500 a data source sends a data source registration message to the NWDAF. At step 502, the NWDAF stores the data source registration, and at step 504 the NWDAF responds to the data source registration request by sending a data source registration acknowledgement message to the data source.

Examples of data sources include, but are not limited to, a source internal to the core network (also referred to herein as an "internal source"), such as an NF/UPF, or a source external to the core network (also referred to herein as an external source), such as an O&M system. In some embodiments, each data source may provide metadata to define what data it exposes. The metadata may include the name of the data, how often the data source will produce such data, where this data is kept (e.g., to some database like a User Data Repository (UDR), or to some temporary place like an Unstructured Data Storage Function (UDSF)), how long the data is kept in the storage, etc. A schema may be provided to explain how the data is composed; e.g., what are the fields of the data, what is the type (e.g., integer, long, string) of each field, etc.

Compute Function Registration

Figure 6:
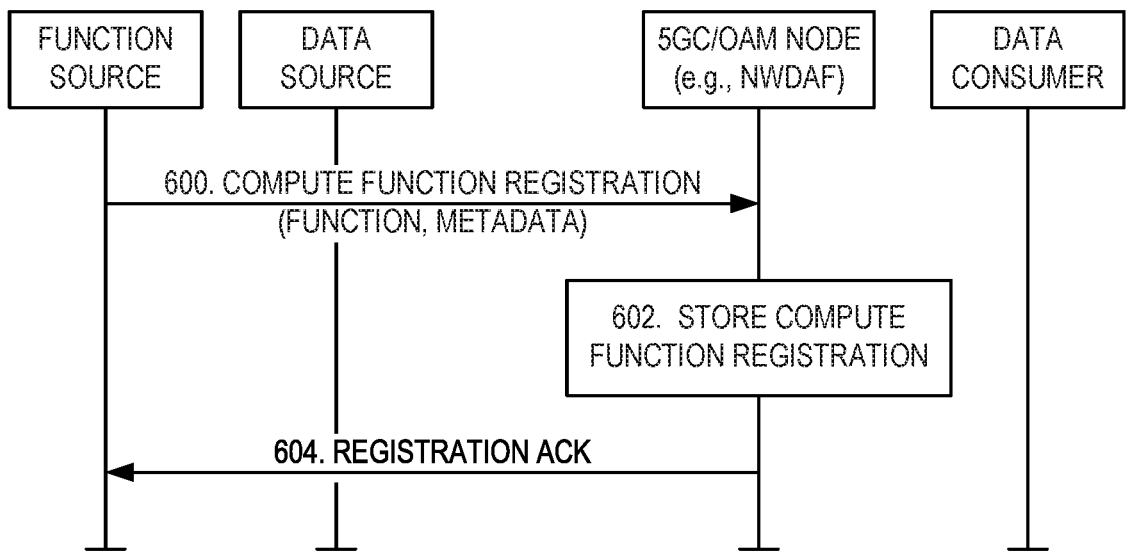
FIG. 6 is a sequence diagram illustrating an example process for compute function registration according to some embodiments of the present disclosure.

FIG. 6 illustrates an exemplary process for compute function registration according to some embodiments of the present disclosure, by which a function source may inform the NWDAF about compute functions that the function source can perform. In the embodiment illustrated in FIG. 6, at step 600 a function source sends a compute function registration message to the NWDAF. At step 602, the NWDAF stores the compute function registration, and at step 604 the NWDAF responds to the compute function registration request by sending a compute function registration acknowledgement message to the function source.

Examples of function sources include, but are not limited to, an internal source, such as an NF (including the NWDAF itself), or an external source. A function source could be 3GPP-defined NFs, but could also be some third party repository of computing functions. In some embodiments, a function may take one or more pieces of data as input and produces output data. In some embodiments, upon registration, metadata may be provided about input and output data of the function. Metadata may include, e.g., the name of the function, the input arguments, the output results, to which data the function is applied, etc.

Registration of data sources and compute functions can occur at any time. Furthermore, the registration may be initiated by the data/function sources, and/or it may be initiated by the NWDAF, e.g., the NWDAF may actively query sources for data and/or functions.

Handling an Information Request

Figure 7:
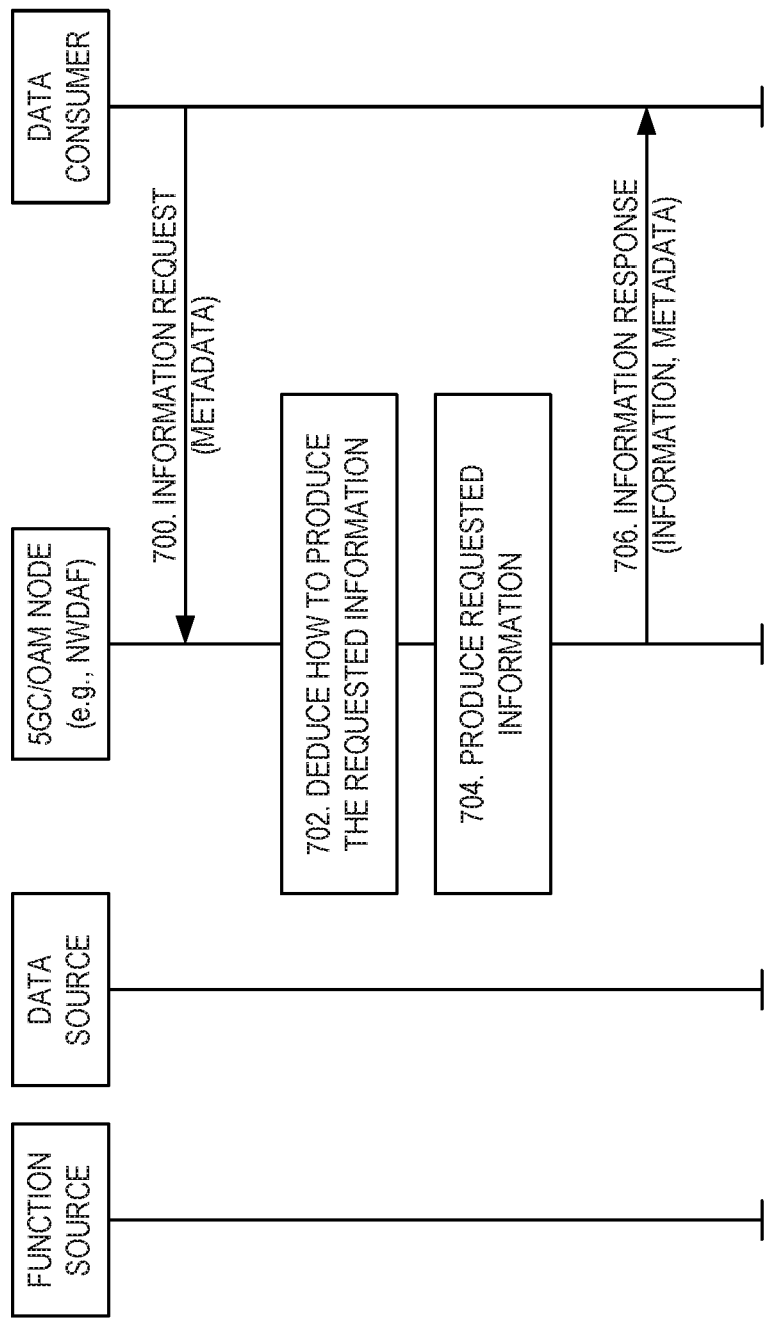
FIG. 7 is a sequence diagram illustrating an example process for handing an information request according to some embodiments of the present disclosure.

FIG. 7 illustrates an exemplary process for handing a request for information according to some embodiments of the present disclosure, by which a data consumer can request information from the NWDAF. In the embodiment illustrated in FIG. 7, at step 700, a data consumer issues a request for information to the NWDAF, the information request identifying the data being requested. In some embodiments, the information request may include metadata that describes the information being requested. Examples of data consumers include, but are not limited to, NFs and AFs, as well as the NWDAF itself.

At step 702, the NWDAF deduces how to produce the requested information. In some embodiments, the NWDAF may take the data registrations and compute function registrations to find out if the requested information can be produced. In some scenarios, the requested information can directly be provided by a single NF. In other scenarios, however, the NWDAF may need to use input data from multiple data sources, utilize one or more compute functions, and/or perform several operations to produce the requested information. A construct that represents the sources and steps needed to produce the requested information is herein referred to as a "pipeline," and the process of deducing how to produce the requested information may be referred to herein alternatively as "building a pipeline," "constructing a pipeline," or "configuring a pipeline."

At step 704, the NWDAF produces the requested information, e.g., by building a pipeline and using the constructed pipeline to produce the requested information. This will be described in more detail in FIGS. 8 and 9, below.

At step 706, the NWDAF provides an information response to the data consumer. If the request was successful, the information response may contain the information that was requested by the data consumer. In the embodiment illustrated in FIG. 7, the information response may also include metadata. That metadata may describe the content of the information provided and may include a status or error message and/or other information.

Processing the Information Request

Regarding how the NWDAF maps an information request to the corresponding computing functions, three different approaches are presented. It will be understood that these approaches are illustrative and not limiting. A first approach is based on a detailed request, a second approach is based on a template, and a third approach is based on an auto-generated template.

Each of these approaches will now be explained using the same example—namely, a request to classify moving UEs into groups (e.g., fast-moving, slow-moving, and non-moving UEs) using the UE location data. Such a calculation typically requires as input the locations of many UEs over time. For this example, the output of this calculation is the distributions of UE moving speed, e.g., a percentage of UEs moving under 10 km/h, between 10 km/h and 30 km/h, and more than 30 km/h.

Figure 8:
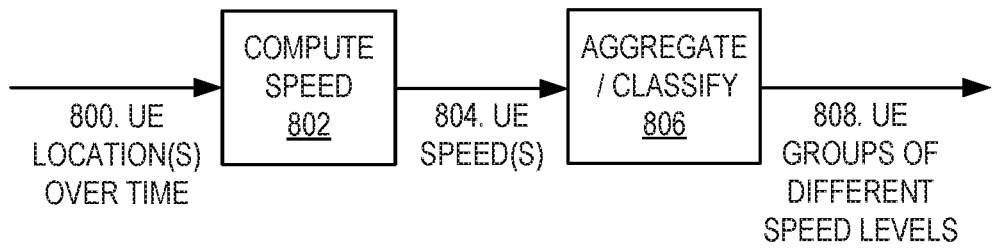
FIG. 8 illustrates an example pipeline to generate the information requested above according to some embodiments of the present disclosure.

FIG. 8 illustrates an example pipeline to generate the information requested above according to some embodiments of the present disclosure, in which the pipeline receives as input data UE locations over time 800. This information may be provided from an AMF or other source of data about UE locations over time. This data may be provided directly by the AMF or other data source or it may be provided by a data repository that stores such data from the data source. In the example illustrated in FIG. 8, this input is provided to a compute function called compute speed 802, which uses UE locations over time to calculate a UE's velocity and which outputs the velocities of a set of one or more UEs 804. In the example illustrated in FIG. 8, this data set is input into another compute function called aggregate and classify 806, which groups UEs into different speed levels and outputs those groups 808.

Mapping Based on a Detailed Request

Using the first approach, the requesting entity sends to the NWDAF a detailed request, e.g., one that specifies the data sources and/or compute functions needed to produce the requested data. For example, the request may specify the following:

Input data: this indicates which data the request is focusing on, e.g., UE locations over time.

Computing functions: It could be a single computing function that processes the data or a set of functions processing the data in a pipeline. In the example above, the "compute speed" function and the "aggregate and classify" function will be specified in that order.

Filter constraints: The filter can be used to process only the data that are of interest. For example, the request can define the time constraint to indicate that it is interested in data from one time point to another time point, especially in an offline data exposure. Of course, the request can define some other filter, like type of UEs, upper bound or lower bound of a specific data field, etc.

Template-Based Mapping

Using the second approach, template-based mapping, the requester only needs to indicate what kind of computing result it wants to get, e.g., UEs grouped into different velocity levels. In this approach, the details, such as which computing functions should be used and which data should be processed, are not specified by the requester. In this example, the requester wants to group the UEs according to their moving speed. In one embodiment, the requester may know that there is already a predefined template for this purpose, which can be invoked by name and provided with one or more parameters. In some embodiments, for example, the requestor can include the keyword "ueGroup(speedLevel)" in the request.

When the NWDAF receives and processes such a request, the NWDAF may determine that the request includes a known keyword, which the NWDAF maps to a template. In some embodiments, if the template defines that, in order to compute speed, the data of UE locations is needed, then the data should be processed by the function for computing speed, and then the UEs will be aggregated according to different speed levels.

In some embodiments, after the mapping the request to the template, the NWDAF translates the request to a data processing pipeline—i.e., identifying data and compute sources needed to fulfil the specific steps defined by the template. In this example, the NWDAF may determine that the UE location data should be provided by an AMF. Likewise, the NWDAF may determine that it supports the compute functions required by the pipeline, or it may identify other NFs that provide one or more of the required compute functions. The NWDAF will then process the data according to the configured pipeline, e.g., taking the data from the AMF as input to the NWDAF and performing the data processing steps illustrated in FIG. 8.

Auto-Generating Mapping

In the template-based mapping just described, the rules in the template can be preconfigured before the requests come. Using the third approach, however, it is possible to go one step further and let the NWDAF auto-generate those rules.

Figure 9:
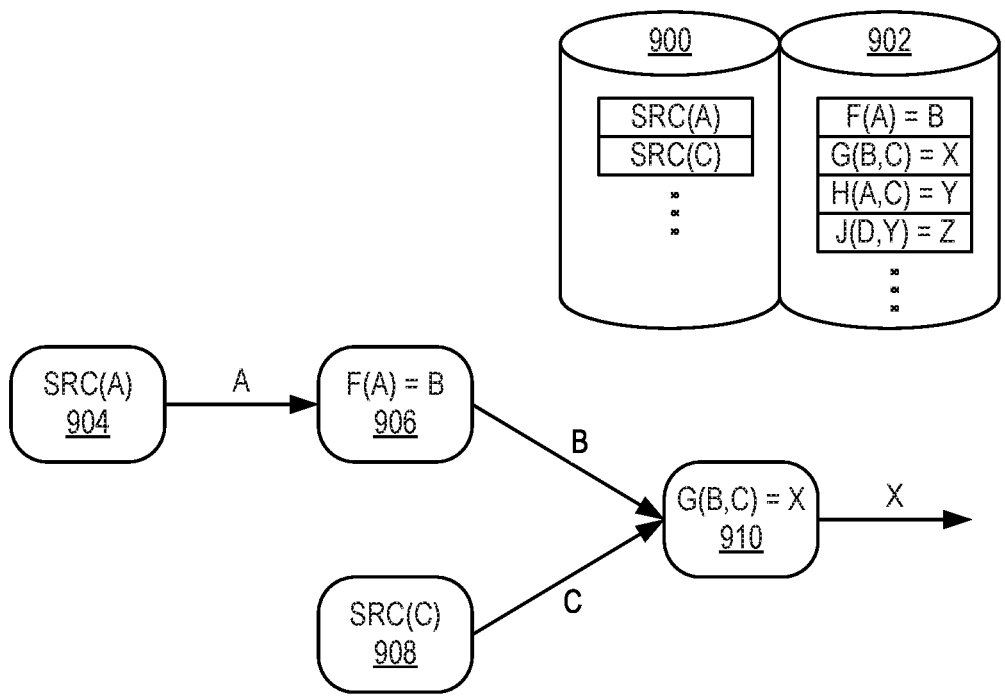
FIG. 9 illustrates an example of an auto-generated pipeline to generate the information requested above according to some embodiments of the present disclosure.

FIG. 9 illustrates an example of an auto-generated pipeline to generate the information requested above according to some embodiments of the present disclosure. Under this approach, the NWDAF receives a request for some specific information and determines whether that specific information can be generated based on the data sources and compute functions that the NWDAF currently knows about, i.e., that are currently registered with the NWDAF.

In this example, a requester has asked for information "X." In the embodiment illustrated in FIG. 9, the NWDAF has a set of registered data sources 900 and a set of registered compute functions 902. In the embodiment illustrated in FIG. 9, the NWDAF has registered two data sources: a source of information A, "SRC(A)," and a source of information C "SRC(C)." The NWDAF has also registered four compute functions: a function F that computes B as a function of A, "F(A)→B"; a function G that computes X as a function of B and C, "G(B,C)→X"; a function H that computes Y as a function of A and C, "H(A,C)→Y"; and a function J that computes Z as a function of D and Y, "J(D,Y)→Z."

In this example, the NWDAF can deduce the rules to setup a pipeline to produce X. In this example, the NWDAF knows that it can produce X from B and C using function G 910. It knows that there is a data source for C, and it knows that it can produce B from A using function F 906. Finally, it knows that it has a data source for A 904. With this, it knows how to produce X from given data sources and compute functions. FIG. 9 describes the data pipeline that the NWDAF internally builds up. In this example, the pipeline so created uses an instance 904 of data source A, an instance 906 of function F, an instance 908 of data source C, and an instance 910 of function G, but does not need to use functions H and J, and therefore does not create an instance of either of these functions. It should be noted that for the following discussion, an "instance" of a data source refers to a data stream provided by the data source. Where a data source provides two different streams of data from the same source, this will be referred to as there being separate instances of that data source.

The NWDAF can reuse the pipeline of the example above for future requests. For example, if a next request asks for information Y, the NWDAF knows that it can add an instance of function H into the pipeline shown in FIG. 9 to produce Y.

In this manner, pipelines can be built up from primitives (data sources and compute functions) and pipelines or segments of pipelines can be used to build new pipelines.

The auto-generated mapping can be further enhanced with techniques from machine intelligence. In some embodiments, the requester may ask for information X in a similar way. In some embodiments, the different compute functions mentioned above may be implemented as artificial intelligence models, and the NWDAF internally decides which models to use to generate an answer to the question asked by the requester.

Mapping a New Request to Existing Requests

Figure 10:
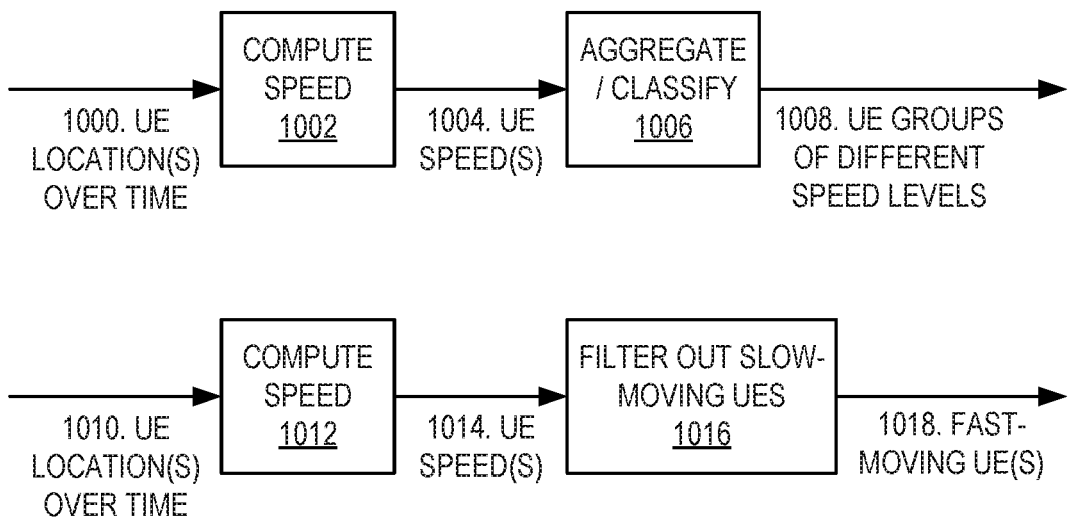
FIG. 10 illustrates an example of a first approach according to some embodiments of the present disclosure, in which two independent pipelines are configured.
Figure 11:
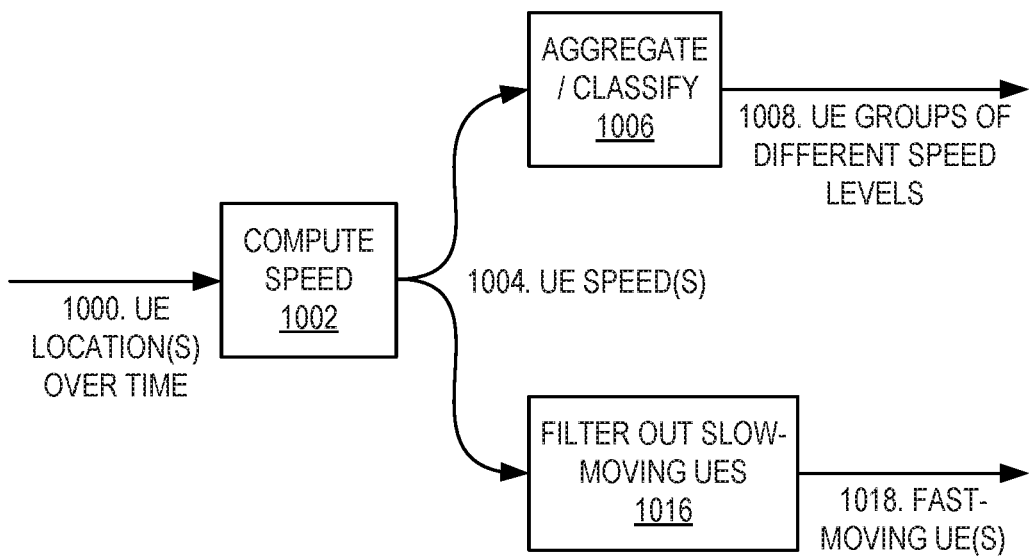
FIG. 11 illustrates an example of a second approach according to some embodiments of the present disclosure, in which common parts of the two pipelines are merged to avoid duplication of work.

Regardless of which of the three approaches above are used (and even if yet another approach is used instead), different data exposure requests may share the same part of the data processing pipeline. For example, one data consumer may request a data processing pipeline such as any of the one shown above, and another request may want a pipeline that produces a similar output, but filtered in some manner. FIGS. 10 and 11, below, show two different approaches that may be taken in such a scenario.

FIG. 10 illustrates an example of a first approach according to some embodiments of the present disclosure, in which two independent pipelines are configured. In this embodiment, the NWDAF constructs two independent pipelines.

The first pipeline includes a first instance 1000 of a data source 1000 and a first instance 1002 of a compute speed function to produce a first data set of UE speeds 1004, which are sent to an instance 1006 of an aggregate and classify function that produces UE groups of different speed levels 1008. The second pipeline includes a second instance 1010 of the same data source and a second instance 1012 of the compute speed function to produce a second data set of UE speeds 1014, which are sent to an instance 1016 of a compute function that filters out slow moving to produce a data set of fast moving UEs 1018. This deployment is inefficient due to the duplicated input data flows.

FIG. 11 illustrates an example of a second approach according to some embodiments of the present disclosure, in which common parts of the two pipelines are merged to avoid duplication of work. In the embodiment illustrated in FIG. 11, both pipelines share the same instance 1000 of a data source and instance 1002 of the compute speed function. The data set of UE speeds 1004 is provided to both the aggregate and classify function instance 1006 and the filter function instance 1016. For example, a copy of the data set of UE speeds 1004 may be provided to the filter function 1016 instance. Alternatively, both function instances 1006 and 1016 may access the same data set of UE speeds 1004 if that access is non-destructive.

In this manner, the NWDAF may increase its processing efficiency by reusing all or part of already configured pipelines. In some embodiments, the NWDAF could maintain a deployment map of all the processing pipelines for all requests; when the NWDAF processes a new request, it checks the map and commonalities between the current processing map and the processing pipeline of the new request to determine whether or not it can reuse existing pipelines.

Not Limited to NWDAF

Even though the solution above is described for NWDAF, it can just as well be used for other network functions that handle data exposure, such as a NEF, for example. Likewise, these techniques may be applied to a standalone data exposure function.

Examples of Data Exposure Requests

In this section, two examples of information requests are presented. However, the possible request implementation is not limited to the examples. The first example is based on Representational State Transfer (REST)-ful Application Program Interface (API), whereas the second example is based on a Yet Another Markup Language (YAML) file. In both examples, the requester wants to group the UEs according to their moving speed, as mentioned above.

In the first example, the RESTful based request looks like the following:
  GET DEF.service/UElocations?$filter=UEtype eq 'vehicle'/ueGroup(speedLevel)

As mentioned above, ueGroup(speedLevel) is a predefined data processing template. The NWDAF will translate the request to a specific data processing pipeline.

In the second example, the requester wants to control the process by itself and thus provides a detailed information request, such as that the input data should be UE locations data collected in a specific time window. The processing pipeline should first compute the speed of UEs, and then aggregate the UEs according to different speed levels. The YAML file could be the following:

kind: data_exposure_request
  input:
    name: UElocations
    time_window:
      start: time1
      end: time2
  functions:
    name: computingSpeed( )
    name: aggregation( )
    rules: speed_level It should be noted that, in some embodiments, the computing functions in the pipeline should be given in order, as shown in the YAML file example. Alternatively, the computing function syntax may be unambiguously defined such that the correct order may be inferred from each step's input and output. Although the example above uses YAML, the same concept may be implemented using another syntax, such as Extensible Markup Language (XML), JavaScript Object Notation (JSON), etc.

Figure 12:
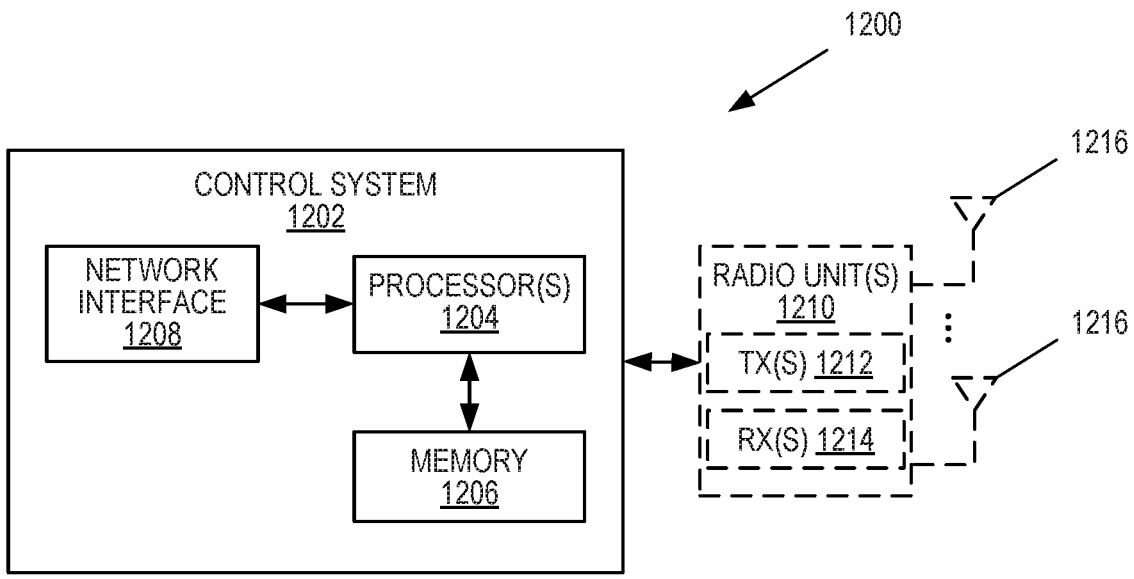
FIG. 12 is a schematic block diagram of an example network node according to some embodiments of the present disclosure.

FIG. 12 is a schematic block diagram of a network node 1200 according to some embodiments of the present disclosure. The network node 1200 may be, for example, a radio access node, such as a base station 202 or 206, a core network node, such as a NWDAF, other NF, or AF, or an Operations, Administration, and Maintenance (OAM) or Operation and Maintenance (O&M) node, such as a Management Function (MF) node. As illustrated, the network node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, the network node 1200 may include one or more radio units 1210 that each includes one or more transmitters 1212 and one or more receivers 1214 coupled to one or more antennas 1216. The radio units 1210 may be referred to or be part of radio interface circuitry. In some embodiments, the radio unit(s) 1210 may be external to the control system 1202 and connected to the control system 1202 via, e.g., a wired connection (e.g., an optical cable). However, in some other embodiments, the radio unit(s) 1210 and potentially the antenna(s) 1216 may also be integrated together with the control system 1202. The one or more processors 1204 operate to provide one or more functions of a network node 1200 as described herein, including, but not limited to, the functions of a control plane function or a UPF as described herein. In some embodiments, the function(s) may be implemented in software that is stored, e.g., in the memory 1206 and executed by the one or more processors 1204.

Figure 13:
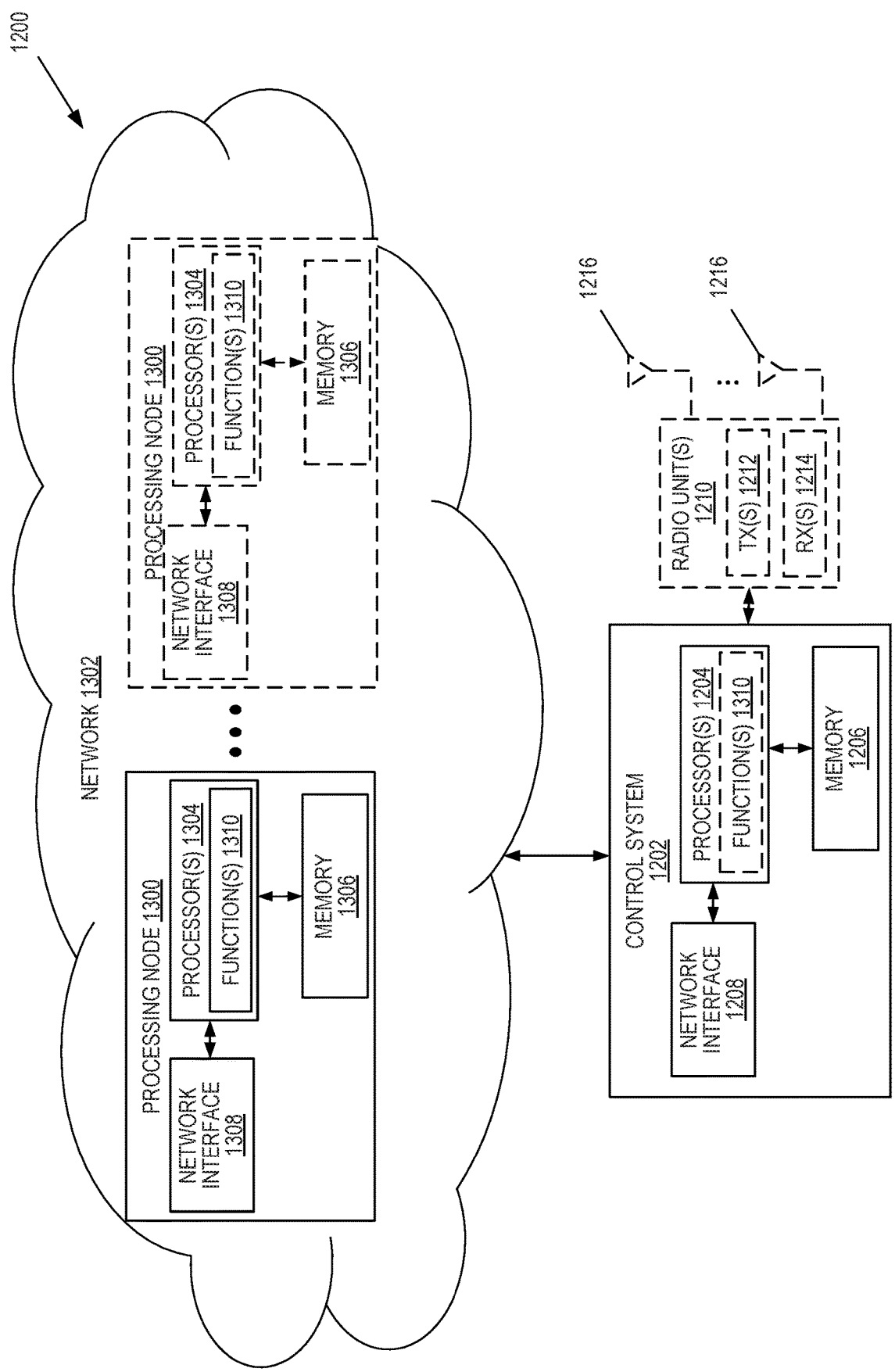
FIG. 13 is a schematic block diagram that illustrates an example virtualized network node according to some embodiments of the present disclosure.

FIG. 13 is a schematic block diagram that illustrates a virtualized network node 1200 according to some embodiments of the present disclosure. This discussion is equally applicable to other types of network nodes. Further, other types of network nodes may have similar virtualized architectures.

As used herein, a "virtualized" network node is an implementation of the network node 1200 in which at least a portion of the functionality of the network node 1200 is implemented as a virtual component(s) (e.g., via a virtual machine(s) executing on a physical processing node(s) in a network(s)). As illustrated, in this example, the network node 1200 includes the control system 1202 that includes the one or more processors 1204 (e.g., CPUs, ASICs, FPGAs, and/or the like), the memory 1206, and the network interface 1208. Where the network node is a radio node, the network node 1200 may include the one or more radio units 1210 that each includes the one or more transmitters 1212 and the one or more receivers 1214 coupled to the one or more antennas 1216, as described above. The control system 1202 is connected to the radio unit(s) 1210 via, for example, an optical cable or the like. The control system 1202 is connected to one or more processing nodes 1300 coupled to or included as part of a network(s) 1302 via the network interface 1208. Each processing node 1300 includes one or more processors 1304 (e.g., CPUs, ASICs, FPGAs, and/or the like), memory 1306, and a network interface 1308.

In this example, functions 1310 of the network node 1200 described herein are implemented at the one or more processing nodes 1300 or distributed across the control system 1202 and the one or more processing nodes 1300 in any desired manner. In some embodiments, some or all of the functions 1310 of the network node 1200 described herein may be implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicate(s) directly with the processing node(s) 1300 via an appropriate network interface(s).

In some embodiments, a computer program including instructions which, when executed by at least one processor, causes the at least one processor to carry out the functionality of network node 1200 or a node (e.g., a processing node 1300) implementing one or more of the functions 1310 of the network node 1200 in a virtual environment according to any of the steps and methods described herein is provided. In some embodiments, a carrier comprising the aforementioned computer program product is also provided. The carrier is one of an electronic signal, an optical signal, a radio signal, or a computer readable storage medium (e.g., a non-transitory computer readable medium such as memory).

Figure 14:
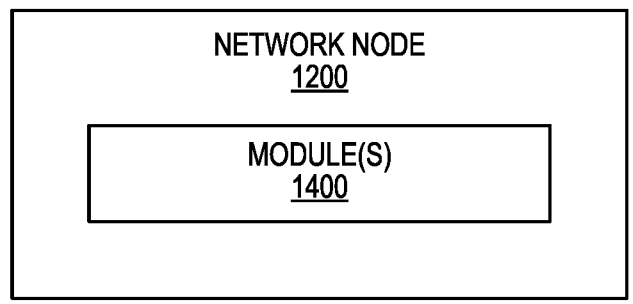
FIG. 14 is a schematic block diagram of an example network node according to some other embodiments of the present disclosure.

FIG. 14 is a schematic block diagram of the network node 1200 according to some other embodiments of the present disclosure. The network node 1200 includes one or more modules 1400, each of which is implemented in software. The module(s) 1400 provide the functionality of the network node 1200 described herein. This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202.

Figure 15:
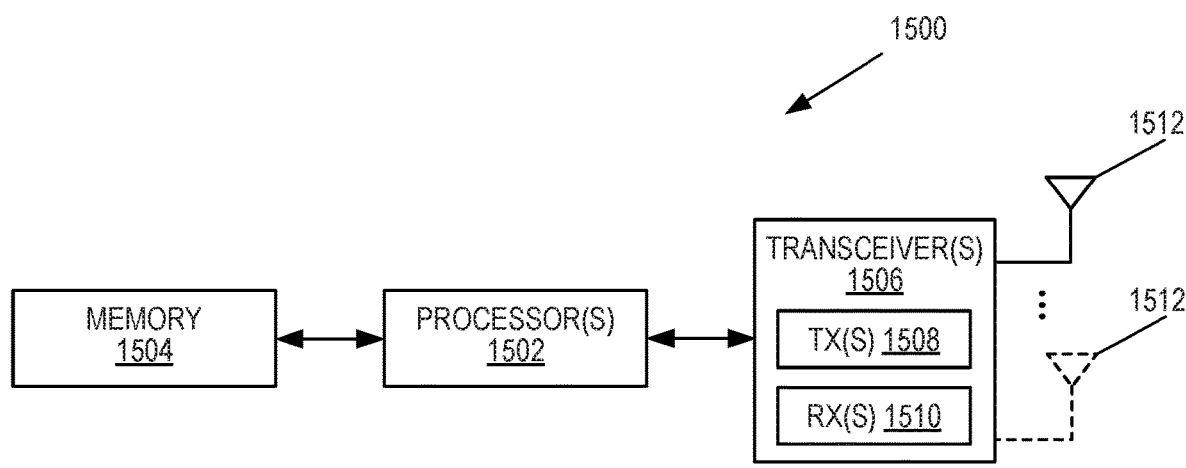
FIG. 15 is a schematic block diagram of an example User Equipment (UE) according to some embodiments of the present disclosure.

FIG. 15 is a schematic block diagram of a UE 1500 according to some embodiments of the present disclosure, which includes one or more processors 1502 (e.g., CPUs, ASICs, FPGAs, and/or the like), memory 1504, and one or more transceivers 1506 each including one or more transmitters 1508 and one or more receivers 1510 coupled to one or more antennas 1512. The transceiver(s) 1506 includes radio-front end circuitry connected to the antenna(s) 1512 that is configured to condition signals communicated between the antenna(s) 1512 and the processor(s) 1502, as will be appreciated by on of ordinary skill in the art. The processors 1502 are also referred to herein as processing circuitry. The transceivers 1506 are also referred to herein as radio circuitry. In some embodiments, the functionality of the UE 1500 described above may be fully or partially implemented in software that is, e.g., stored in the memory 1504 and executed by the processor(s) 1502. Note that the UE 1500 may include additional components not illustrated in FIG. 15 such as, e.g., one or more user interface components (e.g., an input/output interface including a display, buttons, a touch screen, a microphone, a speaker(s), and/or the like and/or any other components for allowing input of information into the UE 1500 and/or allowing output of information from the UE 1500), a power supply (e.g., a battery and associated power circuitry), etc.

In some embodiments, a computer program including instructions which, when executed by at least one processor, causes the at least one processor to carry out the functionality of the UE 1500 according to any of the steps or methods described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
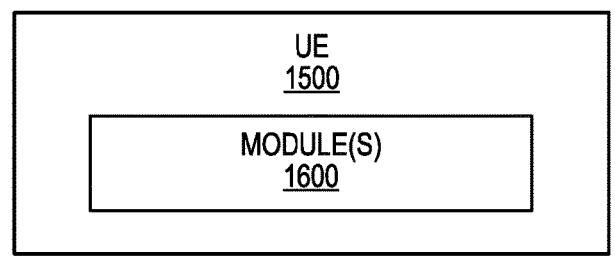
FIG. 16 is a schematic block diagram of another example UE according to some other embodiments of the present disclosure.

FIG. 16 is a schematic block diagram of the UE 1500 according to some other embodiments of the present disclosure, which includes one or more modules 1600, each of which is implemented in software. The module(s) 1600 provide the functionality of the UE 1500 described herein.

Figure 17:
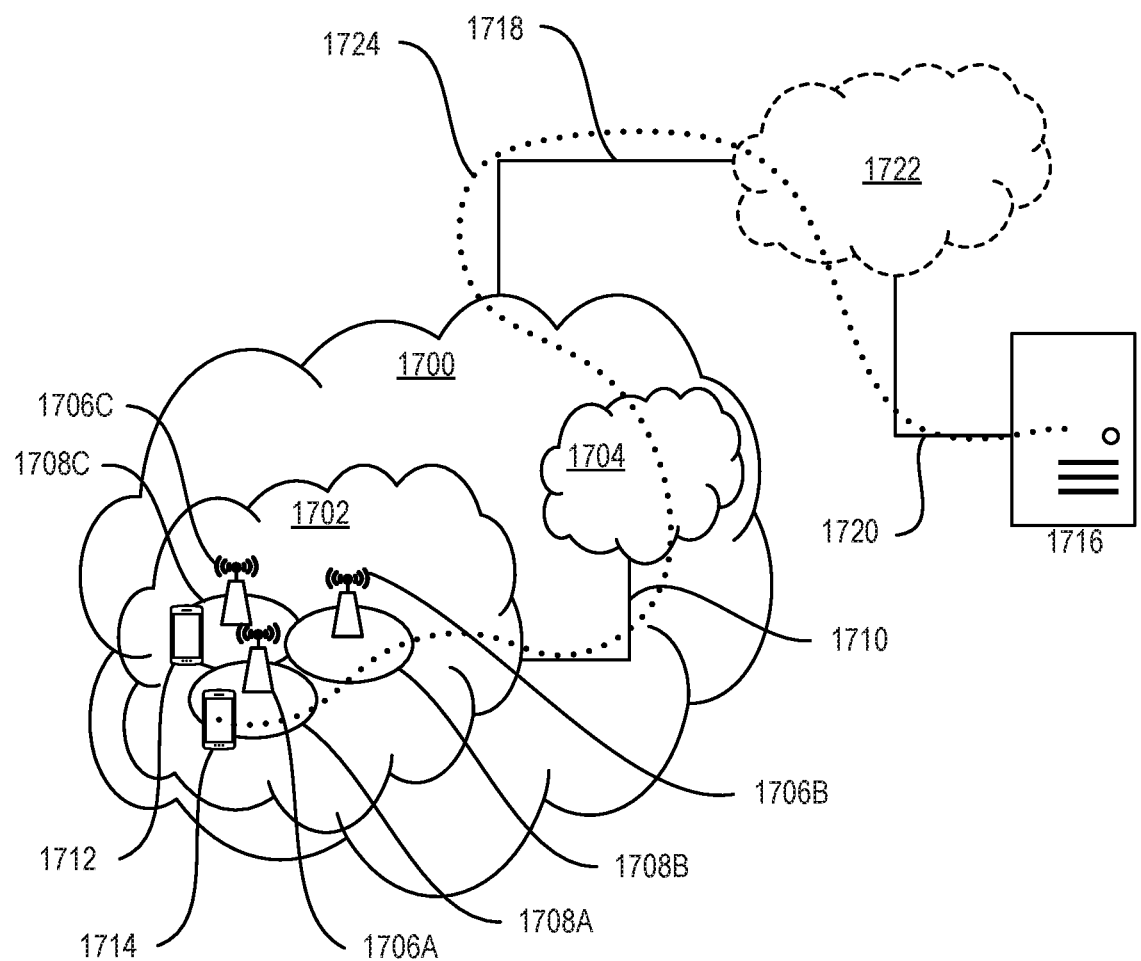
FIG. 17 illustrates an example communication system according to some embodiments of the present disclosure.

FIG. 17 illustrates a communication system according to some embodiments of the present disclosure. With reference to FIG. 17, in accordance with an embodiment, the communication system includes a telecommunication network 1700, such as a 3GPP-type cellular network, which comprises an access network 1702, such as a RAN, and a core network 1704. The access network 1702 comprises a plurality of base stations 1706A, 1706B, 1706C, such as NBs, eNBs, gNBs, or other types of wireless Access Points (APs), each defining a corresponding coverage area 1708A, 1708B, 1708C. Each base station 1706A, 1706B, 1706C is connectable to the core network 1704 over a wired or wireless connection 1710. A first UE 1712 located in coverage area 1708C is configured to wirelessly connect to, or be paged by, the corresponding base station 1706C. A second UE 1714 in coverage area 1708A is wirelessly connectable to the corresponding base station 1706A. While a plurality of UEs 1712, 1714 are illustrated in this example, the example is equally applicable to a situation where a sole UE is in the coverage area or where a sole UE is connecting to the corresponding base station 1706.

The telecommunication network 1700 is itself connected to a host computer 1716, which may be embodied in the hardware and/or software of a standalone server, a cloud-implemented server, a distributed server, or as processing resources in a server farm. The host computer 1716 may be under the ownership or control of a service provider, or may be operated by the service provider or on behalf of the service provider. Connections 1718 and 1720 between the telecommunication network 1700 and the host computer 1716 may extend directly from the core network 1704 to the host computer 1716 or may go via an optional intermediate network 1722. The intermediate network 1722 may be one of, or a combination of more than one of, a public, private, or hosted network; the intermediate network 1722, if any, may be a backbone network or the Internet; in particular, the intermediate network 1722 may comprise two or more sub-networks (not shown).

The communication system of FIG. 17 as a whole enables connectivity between the connected UEs 1712, 1714 and the host computer 1716. The connectivity may be described as an Over-the-Top (OTT) connection 1724. The host computer 1716 and the connected UEs 1712, 1714 are configured to communicate data and/or signaling via the OTT connection 1724, using the access network 1702, the core network 1704, any intermediate network 1722, and possible further infrastructure (not shown) as intermediaries. The OTT connection 1724 may be transparent in the sense that the participating communication devices through which the OTT connection 1724 passes are unaware of routing of uplink and downlink communications. For example, the base station 1706 may not or need not be informed about the past routing of an incoming downlink communication with data originating from the host computer 1716 to be forwarded (e.g., handed over) to a connected UE 1712. Similarly, the base station 1706 need not be aware of the future routing of an outgoing uplink communication originating from the UE 1712 towards the host computer 1716.

Figure 18:
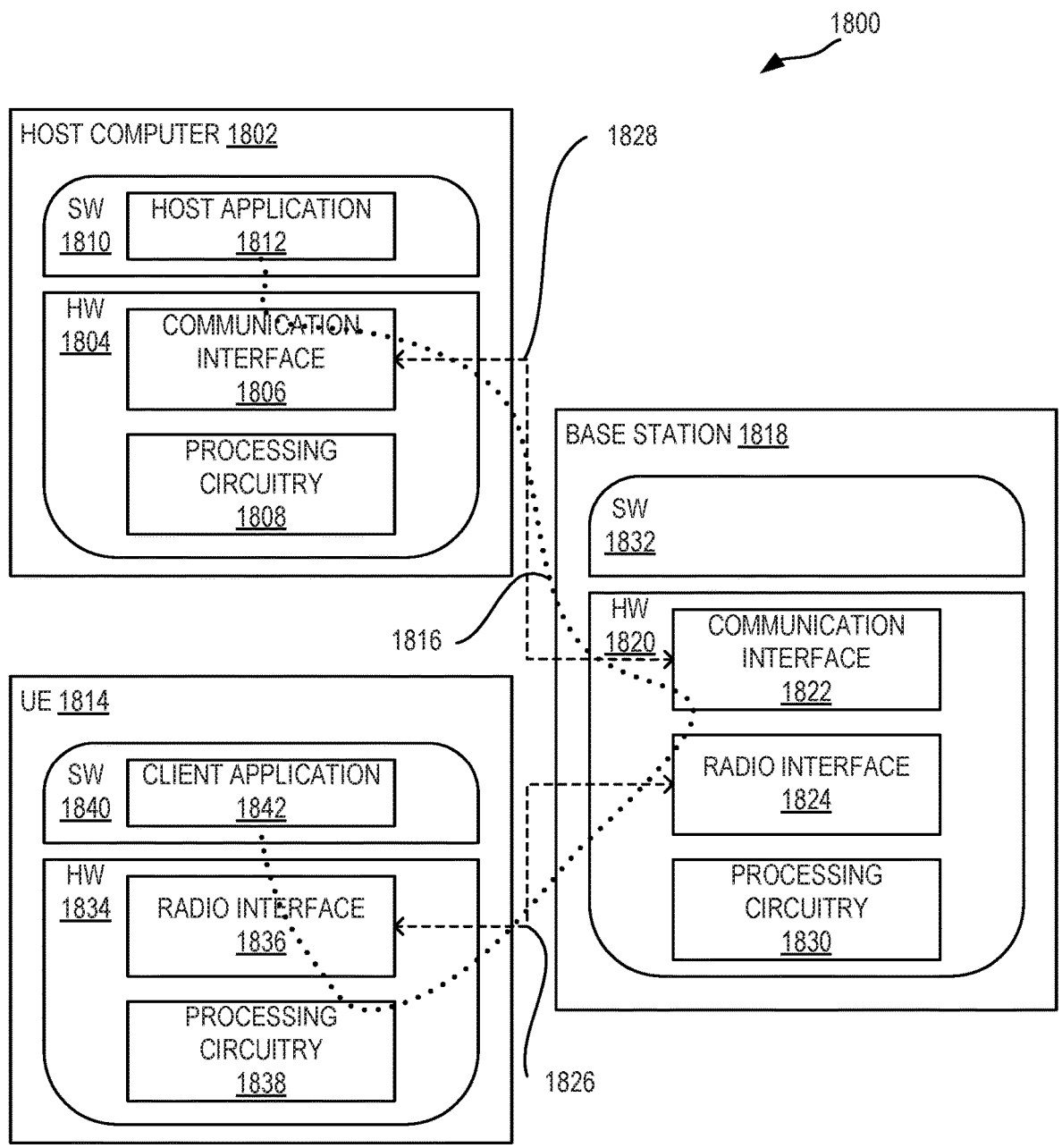
FIG. 18 illustrates another example communication system according to some embodiments of the present disclosure.

FIG. 18 illustrates a communication system in accordance with some embodiments of the present disclosure. Example implementations of the UE, base station, and host computer discussed in the preceding paragraphs will now be described with reference to FIG. 18. In a communication system 1800, a host computer 1802 comprises hardware 1804 including a communication interface 1806 configured to set up and maintain a wired or wireless connection with an interface of a different communication device of the communication system 1800. The host computer 1802 further comprises processing circuitry 1808, which may have storage and/or processing capabilities. In particular, the processing circuitry 1808 may comprise one or more programmable processors, ASICs, FPGAs, or combinations of these (not shown) adapted to execute instructions. The host computer 1802 further comprises software 1810, which is stored in or accessible by the host computer 1802 and executable by the processing circuitry 1808. The software 1810 includes a host application 1812. The host application 1812 may be operable to provide a service to a remote user, such as a UE 1814 connecting via an OTT connection 1816 terminating at the UE 1814 and the host computer 1802. In providing the service to the remote user, the host application 1812 may provide user data which is transmitted using the OTT connection 1816.

The communication system 1800 further includes a base station 1818 provided in a telecommunication system and comprising hardware 1820 enabling it to communicate with the host computer 1802 and with the UE 1814. The hardware 1820 may include a communication interface 1822 for setting up and maintaining a wired or wireless connection with an interface of a different communication device of the communication system 1800, as well as a radio interface 1824 for setting up and maintaining at least a wireless connection 1826 with the UE 1814 located in a coverage area (not shown in FIG. 18) served by the base station 1818. The communication interface 1822 may be configured to facilitate a connection 1828 to the host computer 1802. The connection 1828 may be direct or it may pass through a core network (not shown in FIG. 18) of the telecommunication system and/or through one or more intermediate networks outside the telecommunication system. In the embodiment shown, the hardware 1820 of the base station 1818 further includes processing circuitry 1830, which may comprise one or more programmable processors, ASICs, FPGAs, or combinations of these (not shown) adapted to execute instructions. The base station 1818 further has software 1832 stored internally or accessible via an external connection.

The communication system 1800 further includes the UE 1814 already referred to. The UE's 1814 hardware 1834 may include a radio interface 1836 configured to set up and maintain a wireless connection 1826 with a base station serving a coverage area in which the UE 1814 is currently located. The hardware 1834 of the UE 1814 further includes processing circuitry 1838, which may comprise one or more programmable processors, ASICs, FPGAs, or combinations of these (not shown) adapted to execute instructions. The UE 1814 further comprises software 1840, which is stored in or accessible by the UE 1814 and executable by the processing circuitry 1838. The software 1840 includes a client application 1842. The client application 1842 may be operable to provide a service to a human or non-human user via the UE 1814, with the support of the host computer 1802. In the host computer 1802, the executing host application 1812 may communicate with the executing client application 1842 via the OTT connection 1816 terminating at the UE 1814 and the host computer 1802. In providing the service to the user, the client application 1842 may receive request data from the host application 1812 and provide user data in response to the request data. The OTT connection 1816 may transfer both the request data and the user data. The client application 1842 may interact with the user to generate the user data that it provides.

It is noted that the host computer 1802, the base station 1818, and the UE 1814 illustrated in FIG. 18 may be similar or identical to the host computer 1716, one of the base stations 1706A, 1706B, 1706C, and one of the UEs 1712, 1714 of FIG. 17, respectively. This is to say, the inner workings of these entities may be as shown in FIG. 18 and independently, the surrounding network topology may be that of FIG. 17.

In FIG. 18, the OTT connection 1816 has been drawn abstractly to illustrate the communication between the host computer 1802 and the UE 1814 via the base station 1818 without explicit reference to any intermediary devices and the precise routing of messages via these devices. The network infrastructure may determine the routing, which may be configured to hide from the UE 1814 or from the service provider operating the host computer 1802, or both. While the OTT connection 1816 is active, the network infrastructure may further take decisions by which it dynamically changes the routing (e.g., on the basis of load balancing consideration or reconfiguration of the network).

The wireless connection 1826 between the UE 1814 and the base station 1818 is in accordance with the teachings described throughout this disclosure and may improve the performance of OTT services provided to the UE 1814 using the OTT connection 1816, in which the wireless connection 1826 forms the last segment. More precisely, these teachings may improve the capacity and flexibility of a NWDAF to provide analytics data to data consumers and thereby provide benefits such as increasing the agility of a network operator to provide OTT services under various and varying network conditions and/or for a wide variety of subscriber bases.

A measurement procedure may be provided for the purpose of monitoring data rate, latency, and other factors on which the one or more embodiments described herein improve. There may further be an optional network functionality for reconfiguring the OTT connection 1816 between the host computer 1802 and the UE 1814, in response to variations in the measurement results. The measurement procedure and/or the network functionality for reconfiguring the OTT connection 1816 may be implemented in the software 1810 and the hardware 1804 of the host computer 1802 or in the software 1840 and the hardware 1834 of the UE 1814, or both. In some embodiments, sensors (not shown) may be deployed in or in association with communication devices through which the OTT connection 1816 passes; the sensors may participate in the measurement procedure by supplying values of the monitored quantities exemplified above, or supplying values of other physical quantities from which the software 1810, 1840 may compute or estimate the monitored quantities. The reconfiguring of the OTT connection 1816 may include message format, retransmission settings, preferred routing, etc.; the reconfiguring need not affect the base station 1818, and it may be unknown or imperceptible to the base station 1818. Such procedures and functionalities may be known and practiced in the art. In certain embodiments, measurements may involve proprietary UE signaling facilitating the host computer 1802's measurements of throughput, propagation times, latency, and the like. The measurements may be implemented in that the software 1810 and 1840 causes messages to be transmitted, in particular empty or 'dummy' messages, using the OTT connection 1816 while it monitors propagation times, errors, etc.

FIG. 19 is a flowchart illustrating a method implemented in a communication system, in accordance with some embodiments of the present disclosure. The communication system includes a host computer, a base station, and a UE which may be those described with reference to FIGS. 17 and 18. For simplicity of the present disclosure, only drawing references to FIG. 19 will be included in this section. In step 1900, the host computer provides user data. In sub-step 1902 (which may be optional) of step 1900, the host computer provides the user data by executing a host application. In step 1904, the host computer initiates a transmission carrying the user data to the UE. In step 1906 (which may be optional), the base station transmits to the UE the user data which was carried in the transmission that the host computer initiated, in accordance with the teachings described throughout this disclosure. In step 1908 (which may also be optional), the UE executes a client application associated with the host application executed by the host computer.

FIG. 20 is a flowchart illustrating a method implemented in a communication system, in accordance with some embodiments of the present disclosure. The communication system includes a host computer, a base station, and a UE which may be those described with reference to FIGS. 17 and 18. For simplicity of the present disclosure, only drawing references to FIG. 20 will be included in this section. In step 2000 of the method, the host computer provides user data. In an optional sub-step (not shown) the host computer provides the user data by executing a host application. In step 2002, the host computer initiates a transmission carrying the user data to the UE. The transmission may pass via the base station, in accordance with the teachings described throughout this disclosure. In step 2004 (which may be optional), the UE receives the user data carried in the transmission.

Figures 21, 22:
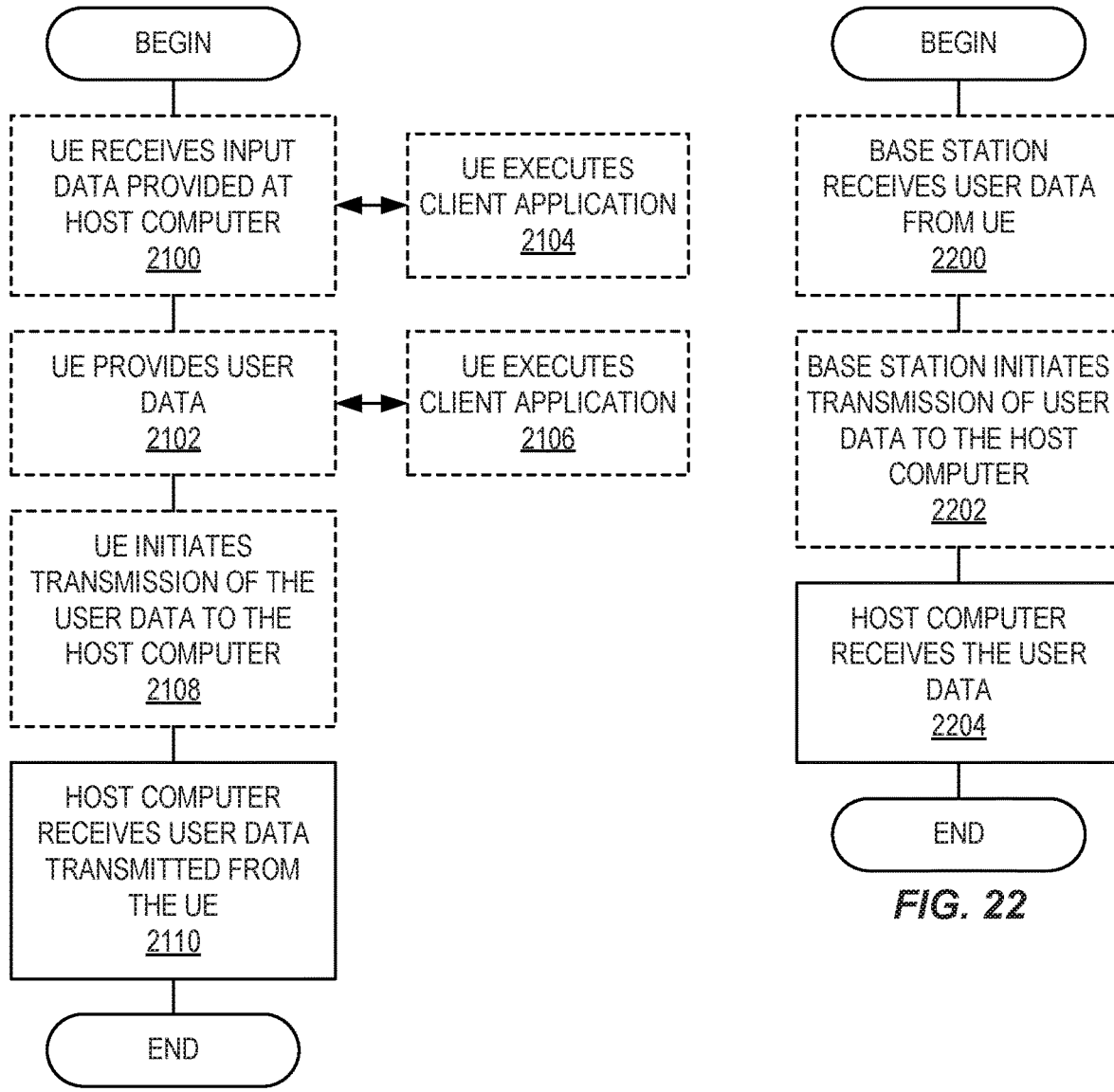
FIG. 21 is a flowchart illustrating another method, implemented in a communication system, for providing flexible information exposure in the 5GC and an Operations, Administration, and Maintenance (OAM) system according to some embodiments of the present disclosure.
FIG. 22 is a flowchart illustrating another method, implemented in a communication system, for providing flexible information exposure in the 5GC and an Operations, Administration, and Maintenance (OAM) system according to some embodiments of the present disclosure.

FIG. 21 is a flowchart illustrating a method implemented in a communication system, in accordance with some embodiments of the present disclosure. The communication system includes a host computer, a base station, and a UE which may be those described with reference to FIGS. 17 and 18. For simplicity of the present disclosure, only drawing references to FIG. 21 will be included in this section. In step 2100 (which may be optional), the UE receives input data provided by the host computer. Additionally or alternatively, in step 2102, the UE provides user data. In sub-step 2104 (which may be optional) of step 2100, the UE provides the user data by executing a client application. In sub-step 2106 (which may be optional) of step 2102, the UE executes a client application which provides the user data in reaction to the received input data provided by the host computer. In providing the user data, the executed client application may further consider user input received from the user. Regardless of the specific manner in which the user data was provided, the UE initiates, in sub-step 2108 (which may be optional), transmission of the user data to the host computer. In step 2110 of the method, the host computer receives the user data transmitted from the UE, in accordance with the teachings described throughout this disclosure.

FIG. 22 is a flowchart illustrating a method implemented in a communication system, in accordance with some embodiments of the present disclosure. The communication system includes a host computer, a base station, and a UE which may be those described with reference to FIGS. 17 and 18. For simplicity of the present disclosure, only drawing references to FIG. 22 will be included in this section. In step 2200 (which may be optional), in accordance with the teachings described throughout this disclosure, the base station receives user data from the UE. In step 2202 (which may be optional), the base station initiates transmission of the received user data to the host computer. In step 2204 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according to the steps and methods described herein.

While processes in the figures may show a particular order of operations, it should be understood that such order is exemplary and not limiting (e.g., the steps and operations may be performed in a different order, certain operations may be combined or there could be overlap of certain operations, etc.).

Moreover, unless otherwise specified, the term "or" in a list is an inclusive or. For example, a claim reciting a request to register a network node as a provider of "data or a compute function" means a request to register the network node as a provider of data, as a provider of a compute function, or as both a provider of data and a provider of a compute function. Likewise, "sending the requested information or an indication that the information request succeeded or failed" means sending the requested information only, or sending an indication that the information request succeeded or failed only, or sending both the requested information and an indication that the information request succeeded or failed. Also, the phrase "at least one of A, B, or C" is to be interpreted as contemplating any of these alternatives: A only, B only, C only, A and B, B and C, A and C, or A, B, and C.

At least some of the following abbreviations may be used in this disclosure. If there is an inconsistency between abbreviations, preference should be given to how it is used above. If listed multiple times below, the first listing should be preferred over any subsequent listing(s).

- 3GPP Third Generation Partnership Project
- 5G Fifth Generation
- 5GC Fifth Generation Core Network
- AF Application Function
- AMF Access and Mobility Management Function
- AN Access Network
- AP Access Point
- API Application Programming Interface
- ASIC Application Specific Integrated Circuit
- AUSF Authentication Server Function
- CPU Central Processing Unit
- CSMF Communication Service Management Function
- DN Data Network
- DSP Digital Signal Processor
- eNB Enhanced or Evolved Node B
- FPGA Field Programmable Gate Array
- gNB New Radio Base Station
- IP Internet Protocol
- JSON JavaScript Object Notation
- LTE Long Term Evolution
- MDAF Management Data Analytics Function
- MF Management Function
- MME Mobility Management Entity
- MTC Machine Type Communication
- NEF Network Exposure Function
- NF Network Function
- NR New Radio
- NRF Network Function Repository Function
- NSMF Network Slice Management Function
- NSSF Network Slice Selection Function
- NSSMF Network Sub Slice Management Function
- NWDAF Network Data Analytics Function
- O&M Operation and Maintenance
- OAM Operations, Administration, and Maintenance
- OTT Over-the-Top
- PCF Policy Control Function
- P-GW Packet Data Network Gateway
- QoS Quality of Service
- RAM Random Access Memory
- RAN Radio Access Network
- REST Representational State Transfer
- ROM Read Only Memory
- RRH Remote Radio Head
- RTT Round Trip Time
- SCEF Service Capability Exposure Function
- SMF Session Management Function
- SON Self-Organizing Network
- TR Technical Report
- TS Technical Specification
- UDM Unified Data Management
- UDR User Data Repository
- UDSF Unstructured Data Storage Function
- UE User Equipment
- UPF User Plane Function
- XML Extensible Markup Language
- YAML Yet Another Markup Language Those skilled in the art will recognize improvements and modifications to the embodiments of the present disclosure. All such improvements and modifications are considered within the scope of the concepts disclosed herein.

What is claimed is:

1. A method, performed by a first network node of a Fifth Generation, 5G, Core Network, 5GC, for providing flexible information exposure in the 5GC and an Operations, Administration, and Maintenance, OAM, system, the method comprising:
   receiving, from a second network node, a request to register the second network node as a provider of data or a compute function;
   registering the second network node as a provider of the data or the compute function;
   storing information associating the second network node with the data or the compute function provided by the second network node;
   sending, to the second network node, a response to the request to register the second network node as a provider of the data or the compute function;
   receiving, from a data consumer, a request for information;
   deducing how to produce the requested information;
   producing the requested information; and
   sending, to the data consumer, an information response.

2. The method of claim 1 wherein the request to register the second network node as a provider of the data or the compute function comprises a request to register the second network node as a provider of the data.

3. The method of claim 2 wherein the request comprises metadata that at least one of:
   identifies the data that the second network node can provide;
   indicates how often the second network node can provide the data;
   indicates a location where the data provided by the second network node is stored;
   indicates how long the data provided by the second network node will be stored; or
   indicates a schema or format for the data provided by the second network node.

4. The method of claim 1 wherein the request to register the second network node as a provider of the data or the compute function comprises a request to register the second network node as a provider of the compute function.

5. The method of claim 4 wherein the request comprises metadata that at least one of:
   identifies the compute function that the second network node can provide;
   indicates the input or inputs to the compute function;
   indicates options or parameters that can modify operation of the compute function;
   indicates an output or outputs from the compute function; or
   identifies data operated upon by the compute function.

6. The method of claim 1 wherein the first network node comprises a Network Data Analytics Function, NWDAF, a Network Exposure Function, NEF, or a Service Capability Exposure Function, SCEF.

7. The method of claim 1 wherein the second network node comprises a 5GC Network Function, NF, an Application Function, AF, or a 5G OAM node or Management Function, MF.

8. The method of claim 1 wherein sending the response comprises sending an indication that the registration request was accepted or was rejected.

* * * * *